(12) United States Patent
Johnson (10) Patent No.: US 11,227,697 B2
(45) Date of Patent: Jan. 18, 2022

(54) SELF-POWERED IN-CORE DETECTOR ARRANGEMENT FOR MEASURING FLUX IN A NUCLEAR REACTOR CORE

(71) Applicant: Framatome Inc., Lynchburg, VA (US)

(72) Inventor: Ian McKeag Johnson, Forest, VA (US)

(73) Assignee: Framatome Inc., Lynchburg, VA (US)

( * ) Notice: Subject to any disclaimer, the term of this patent is extended or adjusted under 35 U.S.C. 154(b) by 315 days.

(21) Appl. No.: 16/173,893

(22) Filed: Oct. 29, 2018

(65) Prior Publication Data

US 2020/0135351 A1 Apr. 30, 2020

(51) Int. Cl.
*G21C 17/108* (2006.01)
*G01T 3/00* (2006.01)
*G21C 17/04* (2006.01)

(52) U.S. Cl.
CPC ............ *G21C 17/108* (2013.01); *G01T 3/006* (2013.01); *G21C 17/044* (2013.01)

(58) Field of Classification Search
CPC .. G21C 17/108; G21C 17/104; G21C 17/112; G21C 17/04; G21C 17/044; Y02E 30/30; G01T 3/006; G01T 7/00; G01T 1/00
See application file for complete search history.

(56) References Cited

U.S. PATENT DOCUMENTS

| | | |
|---|---|---|
| 3,904,881 A | 9/1975 | Klar et al. |
| 3,932,211 A | 1/1976 | Loving, Jr. |
| 4,426,352 A * | 1/1984 | Bybee ...................... G01T 3/006 376/255 |
| 5,032,346 A * | 7/1991 | Girieud ................ G21C 17/104 376/216 |
| 5,039,473 A * | 8/1991 | Girieud .................... G21D 3/16 376/216 |
| 5,225,149 A * | 7/1993 | Banda ...................... G21D 3/04 376/255 |
| 5,251,242 A | 10/1993 | Impink, Jr. et al. |

(Continued)

FOREIGN PATENT DOCUMENTS

| | | |
|---|---|---|
| EP | 0052445 A1 | 5/1982 |
| KR | 20130119391 A | 10/2013 |

OTHER PUBLICATIONS

Search Report and Written Opinion for corresponding PCT/US2019/057458.

*Primary Examiner* — Darlene M Ritchie
(74) *Attorney, Agent, or Firm* — Davidson, Davidson & Kappel, LLC (57) ABSTRACT

An detector-assembly for measuring flux in a nuclear reactor core includes self-powered in-core detector arrangements each for measuring flux at a different one of a plurality of axial locations in the core, and an assembly connector configured to be connected to a power plant connector. The assembly connector includes a plurality flux signal terminals each connected to one of self-powered in-core detector arrangements. At least one of the self-powered in-core detector arrangements comprises a set of at least two self-powered in-core detectors for measuring flux at a same one of the axial locations in the nuclear reactor core. Each of the at least two self-powered in-core detectors includes a sheath, a detector material section inside the sheath, an insulator between the sheath and the detector material, and a flux signal output line. The flux signal output lines of the at least two self-powered in-core detectors are joined together.

16 Claims, 4 Drawing Sheets

(56) References Cited

U.S. PATENT DOCUMENTS

| | | | | |
|---|---|---|---|---|
| 5,875,221 | A * | 2/1999 | Kreuter | G21C 7/00 |
| | | | | 376/215 |
| 6,061,412 | A | 5/2000 | Stucker et al. | |
| 6,408,041 | B2 * | 6/2002 | Hirukawa | G21C 17/108 |
| | | | | 376/254 |
| 6,744,840 | B2 * | 6/2004 | Karino | G21C 17/108 |
| | | | | 376/254 |
| 8,238,509 | B2 * | 8/2012 | Moen | G01T 7/005 |
| | | | | 376/254 |
| 8,445,839 | B2 * | 5/2013 | Holaday | G21C 17/108 |
| | | | | 250/252.1 |
| 8,681,920 | B2 * | 3/2014 | Heibel | G21C 17/10 |
| | | | | 376/245 |
| 10,438,708 | B2 * | 10/2019 | Heibel | G21C 17/102 |
| 11,002,868 | B2 * | 5/2021 | Beck | G21C 17/10 |
| 2007/0201606 | A1 * | 8/2007 | Ishii | G21C 17/112 |
| | | | | 376/371 |
| 2012/0091327 | A1 | 4/2012 | Holaday et al. | |
| 2013/0170596 | A1 * | 7/2013 | Ginsberg | G01K 13/00 |
| | | | | 376/247 |
| 2018/0350473 | A1 * | 12/2018 | van der Ende | G21C 17/10 |

\* cited by examiner

SELF-POWERED IN-CORE DETECTOR ARRANGEMENT FOR MEASURING FLUX IN A NUCLEAR REACTOR CORE

The present disclosure relates generally to nuclear reactor cores and more specifically to detectors for measuring flux in nuclear reactor cores.

BACKGROUND

Inside nuclear reactors, local power is measured inside the nuclear reactor core with in-core detectors designed to operate and survive in the environment. The in-core detectors include self-powered neutron detectors (SPNDs) or self-powered detectors (SPDs). A short section of detector material, lead-wire and crushable ceramic insulators are assembled inside a long thin metal housing. The metal housing is formed of Inconel or stainless steel tubes and is called a sheath. The sheath outer diameter is reduced multiple times crushing the ceramic insulators around the detector material and lead-wire to insulate it from the sheath producing a continuous length SPND or SPD. The detector material within the sheath is aligned within a specific location of the core when inserted. The lead-wire is connected to the bottom of the short section of detector material and extends along the full length of the sheath to carry the electrical signal from the detector material to a connector so it can be transmitted for plant use.

The detector material within the sheath is aligned within a specific location of the core when inserted. The alignment of the detectors is maintained with a cylindrical oversheath of similar materials and crushed around the individual detectors in a similar manner as the sheath for all of the individual detectors. The lead-wire may be connected to an end of the short section of detector material and extending the full length of the sheath to carry the electrical signal from the detector material to a connector so the electrical signal can be transmitted for plant use. There is also a background signal running parallel to the lead-wire in a background detector, which may be inside the same sheath in a twin lead detector or outside of the sheath as a separate detector.

When higher than average output signals are needed, a few different techniques are employed conventionally. A first conventional technique for designing in-core detectors involves using a specific detector material that outputs sufficiently high signals for the given application. A second conventional technique is to design the in-core detectors to be sized large enough to provide sufficiently high signal outputs for the given application. A third conventional technique involves using multiple very long elements of different lengths that cover large parts of the reactor core, then subtracting the signals of the elements and using the difference as the measurement for the one location only covered by one of the elements. A fourth conventional technique is to coil the detector, instead of using a straight detector, to generate a stronger signal than a the straight detector can generate.

SUMMARY OF THE INVENTION

A detector assembly for measuring flux in a nuclear reactor core includes a plurality of self-powered in-core detector arrangements each for measuring flux at a different one of a plurality of axial locations in the nuclear reactor core, and an assembly connector configured to be connected to a power plant connector. The assembly connector includes a plurality flux signal terminals each connected to one of self-powered in-core detector arrangements. At least one of the self-powered in-core detector arrangements comprises a set of at least two self-powered in-core detectors for measuring flux at a same one of the axial locations in the nuclear reactor core. Each of the at least two self-powered in-core detectors includes a sheath, a detector material section inside the sheath, an insulator between the sheath and the detector material, and a flux signal output line. The flux signal output lines of the at least two self-powered in-core detectors are joined together.

A method of providing a detector assembly for measuring flux in a nuclear reactor core comprising is also provided. The method includes arranging a plurality of self-powered in-core detector arrangements in the nuclear reactor core each for measuring flux at a different one of a plurality of axial locations in the nuclear reactor core, and connecting an assembly connector to the self-powered in-core detector arrangements. The assembly connector includes a plurality flux signal terminals each connected to one of self-powered in-core detector arrangements. The assembly connector is configured to be connected to a power plant connector. At least one of the self-powered in-core detector arrangements includes a set of at least two self-powered in-core detectors for measuring flux at a same one of the axial locations in the nuclear reactor core. Each of the at least two self-powered in-core detectors includes a sheath, a detector material section inside the sheath, an insulator between the sheath and the detector material, and a flux signal output line. The flux signal output lines of the at least two self-powered in-core detectors are joined together.

A method of replacing a first detector assembly for measuring flux in a nuclear reactor core with a second detector assembly for measuring flux in a nuclear reactor core is provided. The method includes uninstalling the first detector assembly from the nuclear reactor core. The first detector assembly includes a plurality of first self-powered in-core detector arrangements each for measuring flux at a different one of a plurality of axial locations in the nuclear reactor core, and a first assembly connector configured to be connected to a power plant connector. The first assembly connector includes a plurality of first flux signal terminals each connected to one of first self-powered in-core detector arrangements. At least one of the first self-powered in-core detector arrangements includes a set of at least two first self-powered in-core detectors for measuring flux at a same one of the axial locations in the nuclear reactor core. Each of the at least two first self-powered in-core detectors includes a sheath, a detector material section inside the sheath, an insulator between the sheath and the detector material, and a flux signal output line. The flux signal output lines of the at least two first self-powered in-core detectors being joined together. The uninstalling of the first detector assembly from the nuclear reactor core includes disconnecting the first assembly connector from a power plant electrical connector.

The replacing method also includes installing the second detector assembly in the nuclear reactor core in place of the first detector assembly. The second detector assembly includes a plurality of second self-powered in-core detector arrangements each for measuring flux at a different one of a plurality of axial locations in the nuclear reactor core, and a second assembly connector configured to be connected to a power plant connector. The second assembly connector includes a plurality second flux signal terminals each connected to one of second self-powered in-core detector arrangements. At least one of the second self-powered in-core detector arrangements includes a set of at least two second self-powered in-core detectors for measuring flux at a same one of the axial locations in the nuclear reactor core. Each of the at least two second self-powered in-core detectors includes a sheath, a detector material section inside the sheath, an insulator between the sheath and the detector material, and a flux signal output line. The flux signal output lines of the at least two second self-powered in-core detectors are joined together. The installing of the second detector assembly in the nuclear reactor core includes connecting the second assembly connector to the power plant electrical connector.

BRIEF DESCRIPTION OF THE DRAWINGS

The present invention is described below by reference to the following drawings, in which.

DETAILED DESCRIPTION

One problem with conventional techniques is that when different detector materials are placed in a specific axial location to be representative of that axial measurement in the core, the different materials will provide higher or lower amount of electrical current output based on each materials radiation induced interactions in the given radiation field. Some of these materials do not always output what is considered a high enough signal for a given application and given detector design. The detector design component dimensions are highly engineered and changing them to increase detector output for a given application is not always possible for a multitude of reasons, for example, limited space in the detector assembly, or cost to re-engineer and analyze detector component designs.

In other words, re-engineering a given detector for every situation just because the signal is not as high as needed or expected can be very costly and is prohibitive in most situations. Most detector materials that provide higher output also have dramatic downsides because for a self-powered detector to provide a higher output there is typically much higher depletion of the material, resulting in the detector becoming a consumable having a very short useful life. Decades of analysis and measurements went into the materials, for example rhodium, platinum and vanadium, used today to get the balance of a high enough output and useful lifetimes. The use of the multiple long pieces that cover large parts of the core are difficult to build, will integrate other undesirable signals into the signals, and have larger uncertainty issues with taking two large signals and subtracting them to make one smaller signal. The coiled design costs more to build and is more difficult to model and analyze, while building an assembly of coils takes up more space, making it too large to fit in some limited spaces.

The present disclosure provides methods for building assemblies that each have multiple detector components in each axial space, with lead wires being tied together and their respective background wires being tied together to create one electrically combined detector with multiples of the single detector signal output for the same axial core location. Such methods are simpler to manufacture when compared to a coiled or multiple long element design. The modeling and analysis is also simplified since you just model normal size and length straight already engineered detector designs. Additionally, the measurement and connector design are simplified as compared to conventional techniques because multiple detectors electrically combined in the assembly will have the same connector with the same number of pins as a single detector per axial space. The uncertainty is expected to decrease by increasing the amount of radiation interaction in the same assembly space, thus increasing the useful signal without needing to do any external subtraction. The assemblies may include as many detectors as fit in the allowed space to increase the output as much as is needed.

Figure 1:
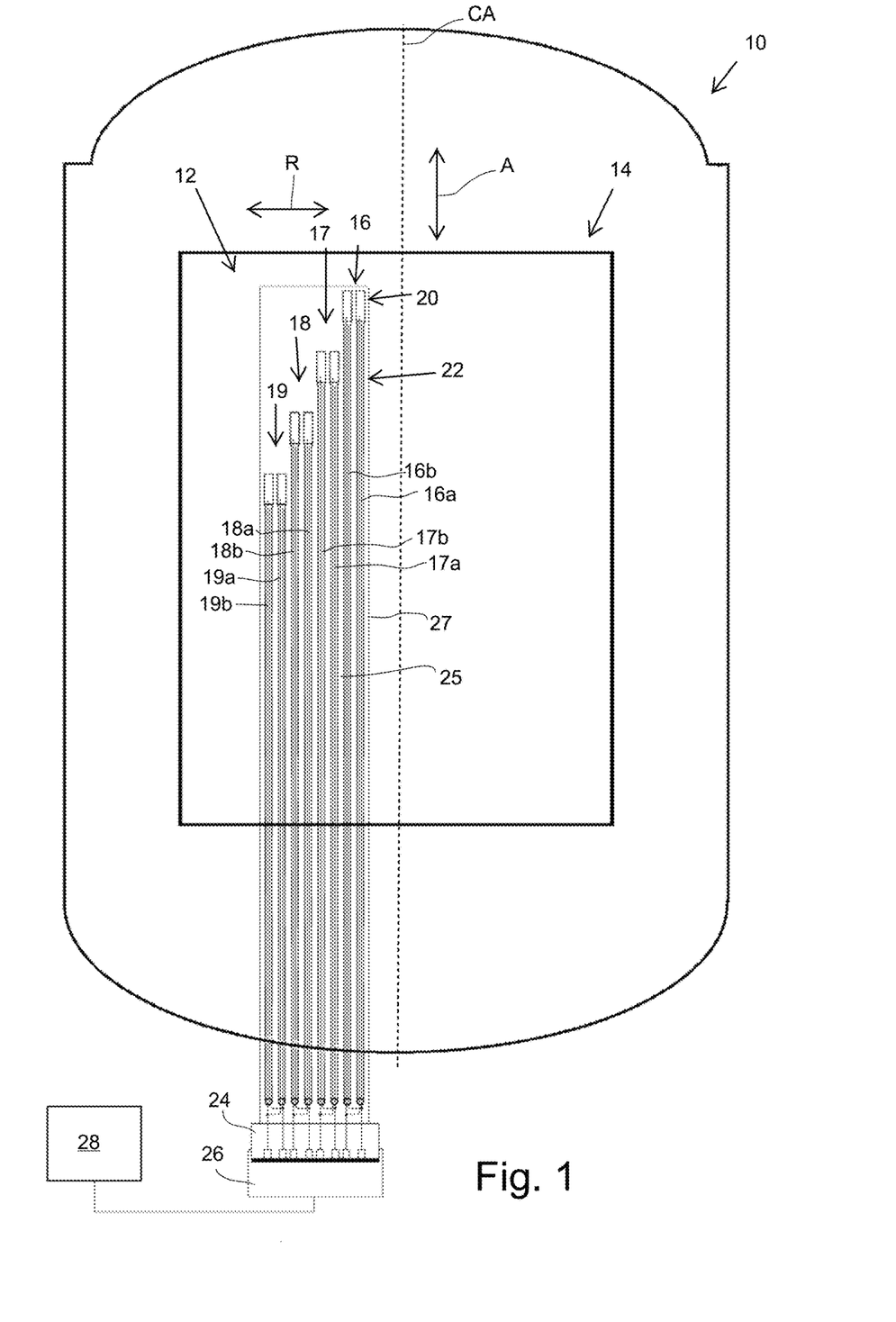
FIG. 1 schematically shows a nuclear reactor pressure vessel including a self-powered in-core detector assembly provided in a reactor core in accordance with an embodiment of the present invention.

FIG. 1 schematically shows a nuclear reactor pressure vessel 10 including a self-powered in-core detector assembly 12 provided in a reactor core 14 of pressure vessel 10 to measure local power in reactor core 14. Pressure vessel 10 is centered on a vertically extending center axis CA. Unless otherwise mentioned, the terms axial, radial and circumferential and derivatives thereof are used in reference to center axis CA, with radial direction R and axial direction A being shown in FIG. 1. Detector assembly 12 includes a plurality of self-powered in-core detector arrangements each comprising a detector set 16, 17, 18, 19. In the embodiment, each of detector sets 16, 17, 18, 19 includes two detectors in the form of SPNDs or SPDs, with detector set 16 including detectors 16a, 16b, detector set 17 including detectors 17a, 17b, detector set 18 including detectors 18a, 18b and detector set 19 including detectors 19a, 19b. Each detector 16a, 16b, 17a, 17b, 18a, 18b, 19a, 19b includes a first section 20 including detector material and a second section 22 extending axially from first section 20 including at least one lead wire. First section 20 has a larger outer diameter than section 22 and is a radially thickest portion of the respective detector 18. Second section 22 is vertically below first section 20 in reactor core 14. Although each detector set 16 to 19 in the embodiment shown in FIG. 1 includes only two detectors per set, in other embodiments, each set may include three or more detectors, with the number of detectors per set being based on spaced considerations in the core and how high a signal is needed. In other embodiments, detector assembly 12 may be loaded through the reactor head.

As shown in FIG. 1, detector sets 16 to 19 are arranged and configured such that first sections 20 of each of the detectors of a respective detector set 16 to 19 are at a same axial location in core 14 and first sections 20 of the detectors of each detector set 16 to 19 are axially offset from the first sections 20 of the detectors of the other detector sets 16 to 19. In other words, detectors 16a, 16b of detector set 16 are at a first axial location in core 14, detectors 17a, 17b of detector set 17 are at a second axial location in core 14 that is axially offset from the first axial location, detectors 18a, 18b of detector set 18 are at a third axial location in core 14 that is axially offset from the first and second axial locations, and detectors 19a, 19b of detector set 19 are at a fourth axial location in core 14 that is axially offset from the first, second and third axial locations. The detectors of each detector set 16 of 19 are of the same configuration—i.e., same size and shape (within the context of manufacturing tolerances) and materials—as the other detector in the set 16 to 19, with detectors 16a, 16b being of the same configuration as each other, detectors 17a, 17b being of the same configuration as each other, detectors 18a, 18b being of the same configuration as each other and detectors 19a, 19b being of the same configuration as each other. All of detectors 16a to 19b have a same sized first section 20, and detectors of each detector set 16 of 19 have a section 22 of the same length and materials as the other detector (or detectors when each detector set includes more than two detectors) of the set 16 to 19, but different from the sections 22 of all of the other sets. More specifically, detectors 16a, 16b have sections 22 of a first length, detectors 17a, 17b have sections 22 of a second length that is less than the first length, detectors 18a, 18b have sections 22 of a third length that is less than the first and second lengths, and detectors 19a, 19b have sections 22 of a fourth length that is less than the first, second and third lengths.

Detectors 16a to 19b are held together by an oversheath 27 that is crushed onto detectors 16a to 19b to rigidly hold detectors 16a to 19b together. Oversheath 27 may be formed of for example stainless steel or Inconel. Oversheath 27 and detectors 16a to 19b extend outside of core 14 and pressure vessel 10 to join an assembly connector 24. The electrical signals output by detectors of a set 16 to 19 in response to the flux in the reactor core—hereafter referred to as flux signals—are linked together with other detector(s) of the detector set for outputting a combined flux signal from connector 24 of assembly 12. Such a configuration allows connector 24 to be inserted into an existing connector 26 of the power plant. Power plant connector 26 then sends the signals through wires to a power plant computer 28 configured for determining the local power in reactor core 14 based on the signals from detectors 16a to 19b for display on a graphical user interface and analysis by a user for operating core 14.

Although assembly 12 is schematically shown as taking up a large portion of core 14, it should be understood that a typical oversheathed cylindrical assembly 12 with up to seven detectors and one thermocouple may for example have an outer diameter <1 cm, and each sheathed detector 16a to 19b may have a typical outer diameter <0.2 cm and the tapered section around half of the detector.

Figure 2:
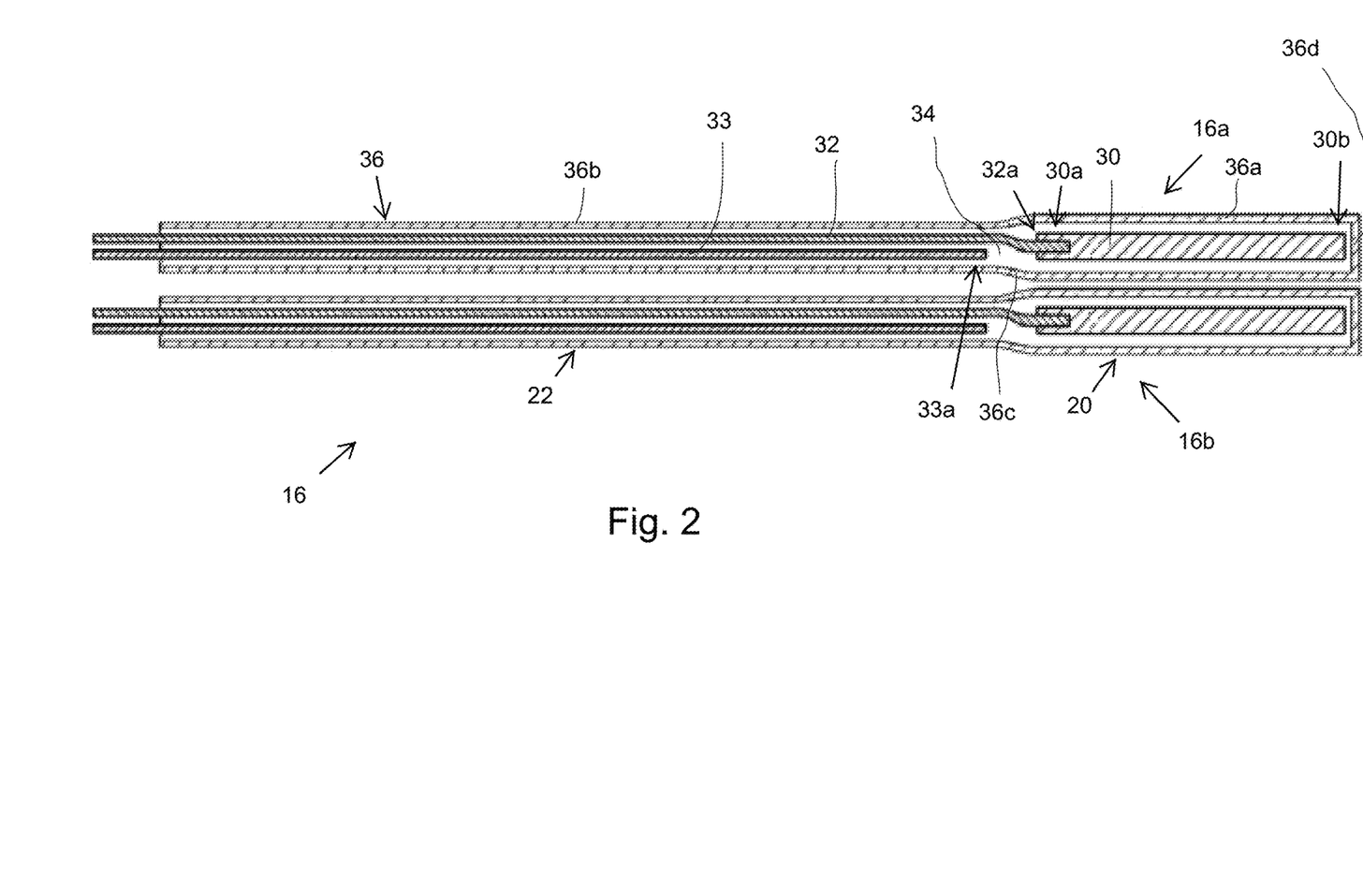
FIG. 2 schematically shows a detailed view of a set of detectors of the detector assembly shown in FIG. 1.

FIG. 2 shows a cross-sectional view of a detector set 16 including detectors 16a, 16b. Detectors of sets 17 to 19 are configured in the same manner as detectors 16a, 16b, but with sections 22 of different lengths that sections 22 of detectors 16a, 16b. Detectors 16a, 16b each include a contiguous section of a flux detecting material 30 and a lead wire 32 extending from a first axial end 30a of detector material section 30. A first axial end 32a of lead wire 32 is embedded in first axial end 30a of detector material section 30. Detectors 16a, 16b each also include a background wire 33 extending parallel to lead wire 32. A first axial end of background wire 33 is spaced axially from detector material section 30 such that background wire 33 is not directly electrically connected to detector material section 30. Detector material section 30 and portions of lead wire 32 and background wire 33 inside of reactor core 14 are embedded in an insulator 34 and directly surrounded by insulator 34 in the radial direction. A first axial end 33a of background wire 33 is axially spaced away from first axial end 30a of detector material section 30 by insulator 34. Insulator 34 is directly surrounded by a sheath 36 in the radial direction and in the axial direction at the second axial end 30b of detector material section 30.

Detector material section 30 is a conducting or semiconducting material that emits electrons as a result of neutron and gamma irradiation, and may be formed example rhodium, platinum, vanadium, aluminum, silver, cadmium, gadolinium, cobalt, hafnium or scandium. Detector material section 30 is shaped as a cylindrical rod. Insulator 34 is electrically insulating and may be formed of ceramic material, for example crushed ceramic material. Wires 32, 33 are formed of electrically conductive material, with each lead wire 32 conveying the flux signal emitted by the respective detector material section 30 and each background wire 33 conveying a respective background signal. Sheath 36 forms a collector and may be formed of for example stainless steel or Inconel. In response to neutron flux in the reactor core, detector material section 30 emits electrons that flow through insulator 34 to sheath 36, causing lead wire 32 to transmit current that forms a flux signal indicating the flux in the axial location of the reactor core.

Detector material section 30 is provided solely in first section 20 and a majority of lead wire 32 is provided in second section 22. Insulator 34 and sheath 36 extend through all of sections 20, 22, with sheath 36 defining outer circumferential surfaces of sections 20, 22. Accordingly, an outer circumferential surface of sheath 36 has larger outer diameter at first section 20, than at second section 22. More specifically, sheath 36 includes a first sheath section 36a that is cylindrical and defines the outer circumferential surface of first section 20, a second sheath section 36b that is cylindrical and defines the outer circumferential surface of second section 22. Sheath 36 also includes a tapered section 36c extending radially outward while extending axially from second section 36b to first section 36a. Sheath 36 further includes an end section 36d axially abutting the portion of insulator 34 that contacts second end 30b of detector material section 30. End section 36d defines a closed end of sheath 36. An axial end of second section 36b that is axially furthest from detector material section 30 defines an open end of sheath 36. Wires 32, 33 of detector 16a extend out through the open end of sheath 36 for linking to the wires 32, 33, respectively, of detector 16b, as explained further below with respect to FIG. 3.

In other embodiments, as disclosed in U.S. patent application Ser. No. 16/149,609, which is hereby incorporated by reference herein, the detectors 16a to 19b may include tail sections having tails wires, the detectors 16a to 19b may lack background wires, or the detectors may include tail sections that lack tail wires and include fillers sections such that all of detectors 16a to 19b extend the same length.

Figure 3:
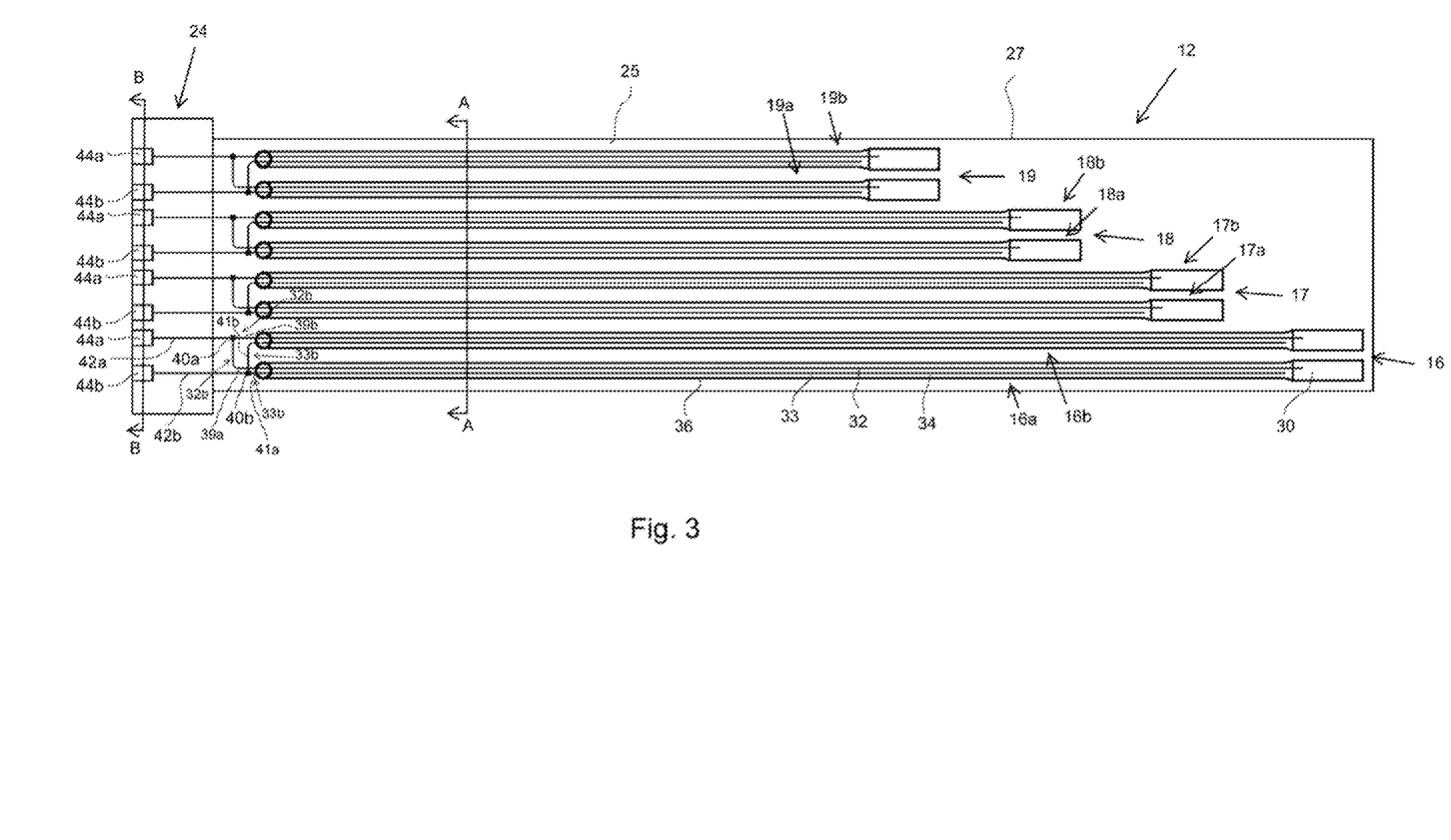
FIG. 3 schematically shows an enlarged view of the detector assembly shown in FIG. 1.

FIG. 3 schematically shows an enlarged view of detector assembly 12 shown in FIG. 1. As noted with respect to FIG. 1, in this exemplary embodiment, detector assembly 12 includes four sets 16 to 19 of detectors, with each set 16 to 19 including two detectors. It should be understood that other embodiments include different numbers of sets and more than two detectors per set. As discussed with respect to FIG. 1, detector sets 16 to 19 are surrounded by oversheath 27, with the inner circumferential surface of oversheath 27 being in contact with outer circumferential surfaces of some or all of detectors 16a to 19b. Connector 24 is fixed to an axial end of oversheath 27. The detector material section 30 of each of detectors 16a to 19b is a same material and a same size and shape (as understood within the context of manufacturing tolerances).

Outside of sheaths 36, flux signal output lines of the detectors of each set 16 to 19 are joined together with the flux signal output lines of the other detector (or detectors, where each set includes two or more detectors) in the set to provide a combined flux signal for identifying the flux of the nuclear reactor core at the axial location of the detector material 30 of the detector set 16 to 19. For example, flux signal output lines 39a, 39b of detectors 16a, 16b, respectively, are joined together to provide a combined flux signal for identifying the flux of the nuclear reactor core at the axial location of the detector material 30 of detectors 16a, 16b.

Also, outside of sheaths 36, background signal output lines of the background wire 33 of each set 16 to 19 are joined together with the output lines of the other detector (or detectors, where each set includes two or more detectors) in the set to provide one combined background signal for the respective detector set 16 to 19. For example, background signal output lines 41a, 41b of detectors 16a, 16b, respectively, are joined together to provide one combined background signal for background wires 33 of detectors 16a, 16b.

More specifically, in the embodiment shown in FIG. 3, the second axial end 32b of each lead wire 32 forms output line 39a and is joined with the second axial end 32b of the other lead wire 32, which forms output line 39b, in the respective detector set 16 to 19, and the second axial end 33b of each background wire 33 forms output line 41a and is joined with the second axial end 33b of the other background wire 33, which forms output line 41b, in the respective detector set 16 to 19. For example, the second axial end 32b of lead wire 32 of detector 16a is joined with the second axial end 32b of lead wire 32 in the detector 16b at a junction 40a, and the second axial end 33b of background wire 33 of detector 16a is joined with the second axial end 33b of the background wire 33 of detector 16b at a junction 40b. Accordingly, the flux signal from lead wires 32 are added together at junction 40a to generate a combined flux signal greater than detector material section 30 of detectors 16a, 16b generate individually and the background signal from background wires 33 are added together at junction 40b to generate a combined background signal greater than background wires 33 of detectors 16a, 16b generate individually. A lead wire section 42a downstream of junction 40a transmits the combined flux signal to a first flux signal terminal in the form of a first flux signal pin 44a of connector 24 and a lead wire section 42b downstream of junction 40b transmits the combined background signal to a first background signal terminal in the form of a first background signal pin 44b of connector 24.

In other words, detector assembly 12 thus includes a plurality of self-powered in-core detector arrangements each for measuring flux at a different one of a plurality of axial locations in the nuclear reactor core 14 and assembly connector 24 configured to be connected to power plant connector 26. Assembly connector 24 includes a plurality flux signal terminals 44a each connected to one of self-powered in-core detector arrangements. At least one of the self-powered in-core detector arrangements a set 16 to 19 of at least two self-powered in-core detectors 16a to 19b for measuring flux at a same one of the axial locations in the nuclear reactor core 14. Each of the at least two self-powered in-core detectors 16a to 19b includes a sheath 36, a detector material section 30 inside the sheath 36, an insulator 34 between the sheath 36 and the detector material 30, and a flux signal output line 39a or 39b. The flux signal output lines 39a or 39b of the at least two self-powered in-core detectors 16a to 19b are joined together.

In the embodiment shown in FIG. 3, the connector 24 includes four flux signal pins 44a for eight detector material sections 30 and four background signal pins 44b for eight background wires 33. In other words, there is one flux signal pin 44a for each detector set 16 to 19, and one background signal pin 44b for each detector set 16 to 19. For the embodiment shown in FIG. 3, connector 26 (FIG. 1) includes four flux signal terminals in the form of flux signal receptacles, each for receiving one of pins 44a, and four background signal terminals in the form of background signal receptacles, each for receiving one of pins 44b. Thus, connector 24 includes two pins for each detector set and connector 26 includes two pin receptacles for mating with the pins for each detector set in the assembly.

Figure 4A:
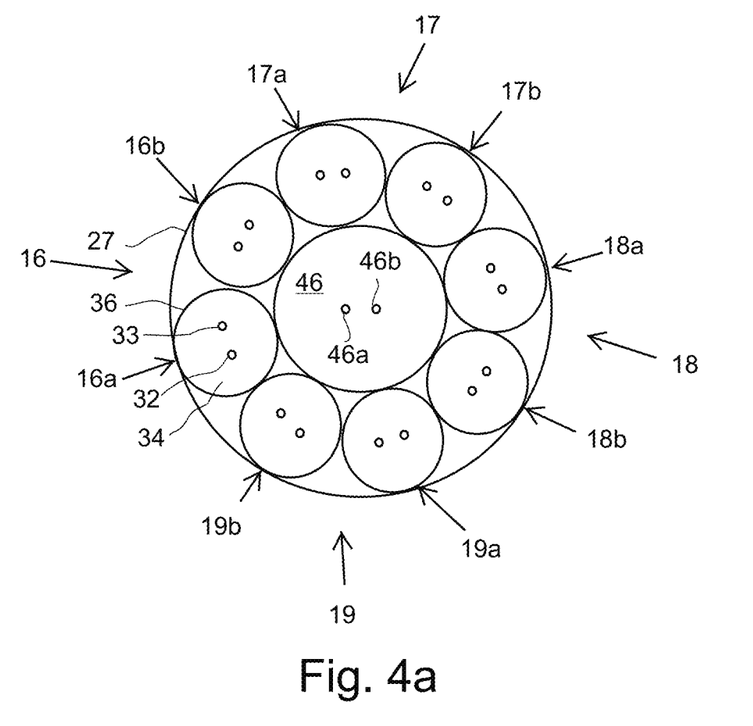
FIG. 4a schematically shows an axial view illustrating how detectors of a detector assembly may be arranged inside of an oversheath at A-A in FIG. 3 in accordance with an embodiment of the present invention.
Figure 4B:
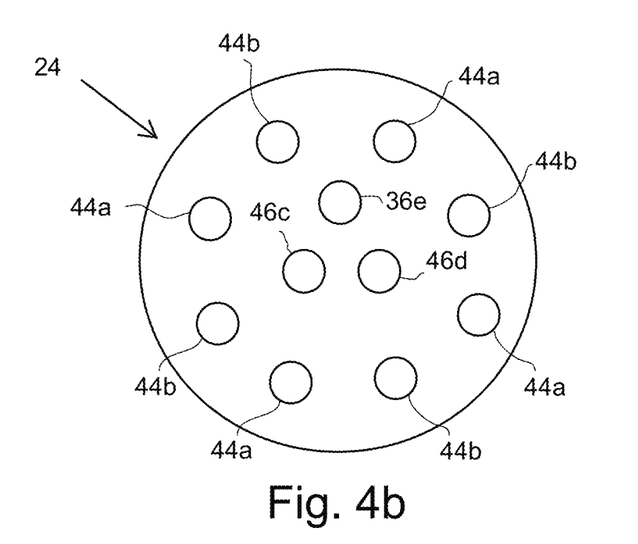
FIG. 4b schematically shows an axial view illustrating how pins of a connector of a detector assembly may be arranged inside of the connector at B-B in FIG. 3 in accordance with an embodiment of the present invention.

FIG. 4a schematically shows an axial view illustrating how detectors 16 to 19 may be arranged inside of oversheath 27 at A-A in FIG. 3 in accordance with an embodiment of the present invention. FIG. 4b schematically shows an axial view illustrating how pins 44a, 44b may be arranged inside of connector 24 at B-B in FIG. 3 in accordance with an embodiment of the present invention.

As shown in FIG. 4a, oversheath 27 may be cylindrical at least in parts and detectors 16a to 19b may be provided in a circular arrangement when viewed axially and the inner circumferential surface of oversheath 27 contacts the outer circumferential surfaces of each of sheaths 36 of detectors 16a to 19b. A thermocouple 46, which includes two conducting wires 46a, 46b, may also be arranged inside of oversheath 27 to measure the temperature within the reactor core.

As shown in FIG. 4b, connector 24 may include four flux signal terminals in the form of pins 44a—one for each detector set 16 to 19, four background signal terminals in the form of pins 44b—one background signal pin 44b for each detector set, two thermocouple terminals in the form of thermocouple pins 46c, 46d and one collector signal terminal in form of a collector signal pin 36e, for a total of eleven pins. Electrical lines from all of sheaths 36 of detectors 16a to 19b electrically connect sheaths 36 to collector signal pin 36e. Such a configuration minimizes the number of pins of the electrical connector for detector assembly 12. For example, if a pin was provided for each of lead wires 32 and background wires 33 in the present example, the electrical connector would include nineteen pins, which is considerably greater than the electrical connector of the present example. If the number of detectors per each of the four detector sets increased from two to three, the difference in pins would be even greater than with an electrical connector including a pin for each detector, as the electrical connector according to an embodiment of the present invention would still include eleven pins, while an electrical connector including a pin for each detector would include twenty-seven pins. Cabling carrying the signals and the amount of electronics needed to measure all of these signals is much reduced, reducing cost and space outside of the reactor.

The merging of detectors from each detector set allows the same connector 24 to be used with different detector assemblies in accordance with embodiments of the present invention. For example, if a first detector assembly configured in the same manner as assembly 12, which is comprised of first detectors 16a to 19b including a first detector material, such as rhodium, has reached the end of its useful life and needs to be replaced, but only detectors including a second detector material, such as vanadium, different from the first detector material are available, second detector sets including a different number of second detectors per set could be used to obtain an acceptably high electrical signal, without changing the number of output terminals on the electrical connector of the second detector assembly in comparison with the first detector assembly. For example, if the each of the first detector sets include only two detectors, but second detector sets each require three detectors because the electrical signals emitted by the second detector material is lower than the electrical signals emitted by the first detector material to obtain an acceptably high signal strength, then the electrical connector 24 for the first and second detector assemblies can still be the same and have the same number of pins because the lead wires of detectors of each set are linked to each other and transmitted to a single pin. Accordingly, the electrical connector for each of the first and second detector assemblies is compatible with the power plant electrical connector 26.

In view of this, the present disclosure also provides a method of replacing a first detector assembly for measuring flux in a nuclear reactor core with a second detector assembly for measuring flux in a nuclear reactor core. The method may include uninstalling the first detector assembly from the nuclear reactor core. The first detector assembly may be formed for example in the same manner as the detector assembly 12 discussed with respect to FIG. 3, and may include a plurality of first self-powered in-core detector arrangements each for measuring flux at a different one of a plurality of axial locations in the nuclear reactor core 14, and a first assembly connector 24 configured to be connected to a power plant connector 26. The first assembly connector 26 comprising a plurality of first flux signal terminals 44a each connected to one of the first self-powered in-core detector arrangements. At least one of the first self-powered in-core detector arrangements comprising a respective set 16 to 19 of at least two first self-powered in-core detectors 16a to 19b for measuring flux at a same one of the axial locations in the nuclear reactor core—e.g., a set 16 of first in-core detectors 16a, 16b, a set 17 of first in-core detectors 17a, 17b, a set 18 of first in-core detectors 18a, 18b and/or a set 19 of first in-core detectors 19a, 19b. Each of the at least two first self-powered in-core detectors 16a to 19b includes a sheath 36, a detector material section 30 inside the sheath 36, an insulator 34 between the sheath 36 and the detector material 30, and a flux signal output line 39a or 39b. The flux signal output lines 39a or 39b of the at least two first self-powered in-core detectors are joined together. The uninstalling of the first detector assembly 12 from the nuclear reactor core 14 includes disconnecting the first assembly connector 24 from power plant electrical connector 26.

The replacing method may also include installing the second detector assembly in the nuclear reactor core in place of the first detector assembly. The second detector assembly may be configured in a similar manner to detector assembly shown in FIG. 3 and may include a plurality of second self-powered in-core detector arrangements each for measuring flux at a different one of a plurality of axial locations in the nuclear reactor core 14, and a second assembly connector configured to be connected to a power plant connector 26. The second assembly connector comprising a plurality flux signal terminals 44a each connected to one of second self-powered in-core detector arrangements. At least one of the self-powered in-core detector arrangements comprising a respective set of at least two second self-powered in-core detectors for measuring flux at a same one of the axial locations in the nuclear reactor core. Each of the at least two second self-powered in-core detectors includes a sheath 36, a detector material section 30 inside the sheath 36, an insulator 34 between the sheath 36 and the detector material 30, and a flux signal output line 39a or 39b. The flux signal output lines 39a or 39b of the at least two second self-powered in-core detectors are joined together. The installing of the second detector assembly from the nuclear reactor core 14 includes connecting the second assembly connector to power plant electrical connector 26.

In the replacing method, the detector material sections of the first self-powered in-core detectors may be formed of a first material, such as for example rhodium, and the detector material sections of the second self-powered in-core detectors are formed of a second material, such as for example vanadium, different from the first material. It should be noted that any of the material mentioned above for the detector material section 20 may be used. The set(s) of the first self-powered in-core detectors each have a first number of detectors and the set(s) of the second self-powered in-core detectors each have a second number of detectors different from the first number. For example, the first set(s) may include two detectors each and the second set(s) may include three detectors each; or the first set(s) may include four detectors each and the second set(s) may include two detector each. The first assembly connector and the second assembly connector may have a same number of terminals, for example, both sets could include 13 terminals as discussed with respect to FIG. 4.

In another replacing method, a conventional detector assembly having a single detector per axial level may be replaced with a new detector assembly having at least a detector arrangement with a set of at least two individual detectors coupled for the same axial level. This will allow the replacement of the conventional detector assembly with a single detector with one material such as rhodium by a new detector assembly having a coupled pair of detector of another material (platinum or vanadium) without changing the power plant electrical connector 26 because the coupled pair of detectors in the replacement assembly are connected to one pin of connector 24, and without changing the electronic range of the computer input and conversion signal because the signal delivered by the rhodium detector is in the same order than the signal delivered by the coupled pair of detectors.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A detector assembly for measuring flux in a nuclear reactor core comprising:
   a plurality of self-powered in-core detector arrangements each for measuring flux at a different one of a plurality of axial locations in the nuclear reactor core; and
   an assembly connector configured to be connected to a power plant connector, the assembly connector comprising a plurality of flux signal terminals each connected to one of self-powered in-core detector arrangements,
   at least one of the self-powered in-core detector arrangements comprising a set of at least two self-powered in-core detectors for measuring flux at a same one of the axial locations in the nuclear reactor core,
   each of the at least two self-powered in-core detectors including a sheath, a detector material section inside the sheath, an insulator between the sheath and the detector material, and a flux signal output line, the flux signal output lines of the at least two self-powered in-core detectors being joined together to provide a combined flux signal, the joined flux signal output lines being connected to a same one of the flux signal terminals of the assembly connector.

2. The detector assembly as recited in claim 1 wherein the detector material section is a same detector material for all of the at least two self-powered in-core detectors.

3. The detector assembly as recited in claim 1 wherein the detector material section is a same size and shape for all of the at least two self-powered in-core detectors.

4. The detector assembly as recited in claim 1 wherein the at least one of the self-powered in-core detector arrangements comprising the set of at least two self-powered in-core detectors comprise:

a first of the self-powered in-core detector arrangements comprising a set of first self-powered in-core detectors for measuring flux at a first axial location in the nuclear reactor core, flux signal output lines of the first self-powered detectors being joined together to provide a first combined flux signal for identifying the flux of the nuclear reactor core at the first axial location; and a second of the self-powered in-core detector arrangements comprising a set of second self-powered in-core detectors for measuring flux at a second axial location in the nuclear reactor core axially offset from the first axial location, flux signal output lines of the second self-powered detectors being joined together to provide a second combined flux signal for identifying the flux of the nuclear reactor core at the second axial location.

5. The detector assembly as recited in claim 4 wherein each of the first self-powered in-core detectors includes a lead wire extending from the detector material section and transmitting a flux signal to one of the flux signal output lines, each of the first self-powered in-core detectors including a background wire spaced from the detector material section by the insulator and transmitting a background signal to a first background signal output line, each of the second self-powered in-core detectors includes a lead wire extending from the detector material section and transmitting a flux signal to one of the flux signal output lines, each of the second self-powered in-core detectors including a background wire spaced from the detector material section by the insulator and transmitting a background signal to a second background signal output line.

6. The detector assembly as recited in claim 5 wherein the first background signal output lines of the first self-powered detectors are joined together to provide a first combined background signal for the set of first self-powered in-core detectors and the second background signal output lines of the second self-powered detectors are joined together to provide a second combined background signal for the set of second self-powered in-core detectors.

7. The detector assembly as recited in claim 6 wherein the connector includes a first background signal terminal for outputting the first combined background signal and a second background signal terminal for outputting the second combined background signal.

8. The detector assembly as recited in claim 7 wherein the connector includes two thermocouple terminals and a collector terminal electrically connected to the sheaths.

9. The detector assembly as recited in claim 4 further comprising:

a set of third self-powered in-core detectors at a third axial location, third flux signal output lines of the third self-powered detectors being joined together to provide a third combined flux signal for identifying the flux of the nuclear reactor core at the third axial location; and a set of fourth self-powered in-core detectors at a fourth axial location axially offset from the third axial location, fourth flux signal output lines of the fourth self-powered detectors being joined together to provide a fourth combined flux signal for identifying the flux of the nuclear reactor core at the fourth axial location, each of the third self-powered in-core detectors and the fourth self-powered in-core detectors including a respective sheath, a detector material section inside the sheath and an insulator between the sheath and the detector material section.

10. A method of providing a detector assembly for measuring flux in a nuclear reactor core comprising:

arranging a plurality of self-powered in-core detector arrangements in the nuclear reactor core each for measuring flux at a different one of a plurality of axial locations in the nuclear reactor core;

connecting an assembly connector to the self-powered in-core detector arrangements, the assembly connector comprising a plurality flux signal terminals each connected to one of self-powered in-core detector arrangements, the assembly connector configured to be connected to a power plant connector, at least one of the self-powered in-core detector arrangements comprising a set of at least two self-powered in-core detectors for measuring flux at a same one of the axial locations in the nuclear reactor core, each of the at least two self-powered in-core detectors including a sheath, a detector material section inside the sheath, an insulator between the sheath and the detector material, and a flux signal output line, the flux signal output lines of the at least two self-powered in-core detectors being joined together to provide a combined flux signal, and connecting the joined flux signal output lines to a same one of the flux signal terminals of the assembly connector.

11. The method as recited in claim 10 wherein the detector material section is a same detector material for all of the at least two self-powered in-core detectors.

12. The method as recited in claim 11 wherein the detector material section is a same size and shape for all of the at least two self-powered in-core detectors.

13. The method as recited in claim 12 wherein the arranging of the plurality of self-powered in-core detector arrangements in the nuclear reactor core comprises:

arranging a first self-powered in-core detector arrangement in the nuclear reactor core at a first axial location, the first self-powered in-core detector arrangement comprising a set of first self-powered in-core detectors for measuring flux at the first axial location in the nuclear reactor core, flux signal output lines of the first self-powered detectors being joined together to provide a first combined flux signal for identifying the flux of the nuclear reactor core at the first axial location; and arranging a second self-powered in-core detector arrangement in the nuclear reactor core at a second axial location axially offset from the first axial location, the first self-powered in-core detector arrangement comprising a set of second self-powered in-core detectors for measuring flux at the second axial location, flux signal output lines of the second self-powered detectors being joined together to provide a second combined flux signal for identifying the flux of the nuclear reactor core at the second axial location.

14. The method as recited in claim 13 wherein each of the first self-powered in-core detectors includes a lead wire extending from the detector material section and transmitting a flux signal to one of the flux signal output lines,
  each of the first self-powered in-core detectors including a background wire spaced from the detector material section by the insulator and transmitting a background signal to a first background signal output line,
  each of the second self-powered in-core detectors includes a lead wire extending from the detector material section and transmitting a flux signal to one of the flux signal output lines,
  each of the second self-powered in-core detectors including a background wire spaced from the detector material section by the insulator and transmitting a background signal to a second background signal output line,
  the first background signal output lines of the first self-powered detectors are joined together to provide a first combined background signal for the set of first self-powered in-core detectors and the second background signal output lines of the second self-powered detectors are joined together to provide a second combined background signal for the set of second self-powered in-core detectors.

15. The method as recited in claim 14 wherein the connector includes a first background signal terminal for outputting the first combined background signal and a second background signal terminal for outputting the second combined background signal.

16. The method as recited in claim 15 wherein the connector includes two thermocouple terminals and a collector terminal electrically connected to the sheaths.

* * * * *